(12) United States Patent
Hida

(10) Patent No.: US 10,916,962 B2
(45) Date of Patent: Feb. 9, 2021

(54) DUAL ENERGY STORE AND DUAL CHARGING SOURCE VEHICLE POWER SUPPLY SYSTEM AND VEHICLE DRIVE SYSTEM

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Yoshihiro Hida, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 146 days.

(21) Appl. No.: 16/077,221

(22) PCT Filed: Mar. 8, 2017

(86) PCT No.: PCT/JP2017/009192
§ 371 (c)(1),
(2) Date: Aug. 10, 2018

(87) PCT Pub. No.: WO2017/159485
PCT Pub. Date: Sep. 21, 2017

(65) Prior Publication Data
US 2019/0036374 A1 Jan. 31, 2019

(30) Foreign Application Priority Data
Mar. 16, 2016 (JP) ................... 2016-052195

(51) Int. Cl.
*H02J 7/14* (2006.01)
*B60R 16/033* (2006.01)
(Continued)

(52) U.S. Cl.
CPC ............... *H02J 7/14* (2013.01); *B60K 6/28* (2013.01); *B60L 3/0046* (2013.01); *B60L 50/15* (2019.02);
(Continued)

(58) Field of Classification Search
CPC ........ B60L 3/0046; B60L 58/10; B60L 58/18; B60L 50/15; B60R 16/033; H02J 7/02;
(Continued)

(56) References Cited

U.S. PATENT DOCUMENTS 3,763,415 A * 10/1973 Ownby ................. H02J 7/1423
320/117
4,348,628 A * 9/1982 Loucks ................. H02J 7/1423
320/124
(Continued)

FOREIGN PATENT DOCUMENTS

JP    H9-308013 A    11/1997
JP    2005-009320 A    1/2005
(Continued)

OTHER PUBLICATIONS

May 9, 2017 International Search Report issued in International Patent Application No. PCT/JP2017/009192.

*Primary Examiner* — John T Trischler
(74) *Attorney, Agent, or Firm* — Oliff PLC

(57) ABSTRACT

A vehicle power supply system that includes an alternator; a first electrical storage device that is charged by the alternator; a power generator that generates power in conjunction with traveling of the vehicle; a second electrical storage device that is charged by the power generator; a (Continued)

charge path used to charge the second electrical storage device with power from the power generator; a first power feed path for feeding power to the actuator from the first electrical storage device; a second power feed path for feeding power to the actuator from the second electrical storage device; a third power feed path for feeding power to the control load from the first electrical storage device; a fourth power feed path for feeding power to the control load from the second electrical storage device; a first switch and a second switch.

11 Claims, 3 Drawing Sheets

(51) Int. Cl.
| | |
|---|---|
| B60L 58/18 | (2019.01) |
| B60T 17/18 | (2006.01) |
| B60L 50/15 | (2019.01) |
| B60L 3/00 | (2019.01) |
| B60L 58/10 | (2019.01) |
| B60K 6/28 | (2007.10) |
| B60W 10/26 | (2006.01) |
| B60W 20/50 | (2016.01) |
| B60T 8/17 | (2006.01) |
| B60T 17/22 | (2006.01) |
| B60T 8/00 | (2006.01) |

(52) U.S. Cl.
CPC .............. *B60L 58/10* (2019.02); *B60L 58/18* (2019.02); *B60R 16/033* (2013.01); *B60T 17/18* (2013.01); *B60W 10/26* (2013.01); *B60W 20/50* (2013.01); *B60L 2210/10* (2013.01); *B60T 8/00* (2013.01); *B60T 8/17* (2013.01); *B60T 17/22* (2013.01); *B60T 2270/414* (2013.01); *Y02T 10/92* (2013.01)

(58) Field of Classification Search
CPC . H02J 7/14; B60K 6/28; B60W 10/26; B60W 20/50
USPC .......................................................... 320/127
See application file for complete search history.

(56) References Cited

U.S. PATENT DOCUMENTS

| | | | | | |
|---|---|---|---|---|---|
| 5,198,698 | A * | 3/1993 | Paul | ........................... | H02J 9/08 307/64 |
| 5,245,267 | A * | 9/1993 | Pierret | ................... | H02J 7/1423 320/119 |
| 5,323,102 | A * | 6/1994 | Torii | ..................... | H02J 7/1423 322/90 |
| 5,418,401 | A * | 5/1995 | Kaneyuki | ............. | H02J 7/1423 307/10.1 |
| 5,883,496 | A * | 3/1999 | Esaki | ...................... | B60L 58/20 320/132 |
| 5,907,194 | A * | 5/1999 | Schenk | ................... | H02P 9/307 307/10.1 |
| 5,945,807 | A * | 8/1999 | Faulk | ..................... | H02J 7/0063 320/128 |
| 6,218,643 | B1 * | 4/2001 | Iwata | ..................... | H02J 7/1438 219/202 |
| 6,456,035 | B1 * | 9/2002 | Crisp | ................. | H02J 2207/40 320/106 |
| 6,481,516 | B1 * | 11/2002 | Field | ..................... | B60W 20/10 180/65.23 |
| 6,491,121 | B2 * | 12/2002 | Morimoto | ............. | B60K 6/485 180/65.26 |
| 6,815,931 | B1 * | 11/2004 | Wells | ..................... | H02J 7/1423 320/164 |
| 6,864,663 | B2 * | 3/2005 | Komiyama | ............... | B60K 6/34 320/104 |
| 6,962,135 | B2 * | 11/2005 | Kahlon | .................. | B60K 6/485 123/179.3 |
| 7,098,556 | B2 * | 8/2006 | Kawai | .................... | B60W 20/13 307/46 |
| 7,227,273 | B2 * | 6/2007 | Ahmad | ................... | B60L 50/13 290/40 C |
| 7,304,445 | B2 * | 12/2007 | Donnelly | .................. | B60L 7/06 318/108 |
| 7,330,012 | B2 * | 2/2008 | Ahmad | ................... | B60L 50/51 318/811 |
| 7,336,002 | B2 * | 2/2008 | Kato | ................... | F02N 11/0866 307/10.6 |
| 7,385,372 | B2 * | 6/2008 | Ahmad | .................. | B60K 6/46 318/811 |
| 7,416,039 | B1 * | 8/2008 | Anderson | ................ | B60K 1/00 180/165 |
| 7,420,295 | B2 * | 9/2008 | Omae | ........................ | H02J 7/34 307/66 |
| 7,428,438 | B2 * | 9/2008 | Parramon | .......... | A61N 1/37223 607/33 |
| 7,479,757 | B2 * | 1/2009 | Ahmad | .................... | B60K 6/46 318/811 |
| RE40,820 | E * | 7/2009 | Rogers | ................... | H02J 7/1423 324/427 |
| 7,565,867 | B2 * | 7/2009 | Donnelly | ................... | B60L 9/22 105/26.05 |
| 7,723,932 | B2 * | 5/2010 | King | ........................ | B60L 58/12 318/139 |
| 7,782,015 | B1 * | 8/2010 | Aaron | ..................... | H02J 7/1423 320/123 |
| 7,841,434 | B2 * | 11/2010 | Shimada | .................. | B60L 50/61 180/65.27 |
| 7,851,932 | B2 * | 12/2010 | Rome | ........................ | A45F 3/08 290/10 |
| 7,856,816 | B2 * | 12/2010 | Duray | ...................... | B60K 6/12 60/414 |
| 7,977,812 | B2 * | 7/2011 | Senda | ..................... | B60R 16/03 307/10.1 |
| 8,001,906 | B2 * | 8/2011 | King | ........................ | B60L 58/26 105/61 |
| 8,030,880 | B2 * | 10/2011 | Alston | ..................... | H02J 7/342 320/103 |
| 8,067,853 | B2 * | 11/2011 | Tachibana | ................. | H02J 1/08 307/10.1 |
| 8,244,419 | B2 * | 8/2012 | Wegner-Donnelly | ........................ | B63H 23/24 105/61 |
| 8,269,457 | B2 * | 9/2012 | Wenger | .................... | B60K 6/40 320/109 |
| 8,401,779 | B2 * | 3/2013 | Troncoso | ................ | B60R 16/03 701/123 |
| 8,408,341 | B2 * | 4/2013 | Dalum | .................... | B60L 50/16 180/65.22 |
| 8,427,083 | B2 * | 4/2013 | Warmenhoven | ....... | H02K 53/00 318/139 |
| 8,442,718 | B2 * | 5/2013 | Ahn | ......................... | H02J 7/16 701/36 |
| 8,498,767 | B2 * | 7/2013 | Kotani | .................. | H02J 7/1438 701/22 |
| 8,744,677 | B2 * | 6/2014 | Shimasaki | ................ | B60L 1/02 701/36 |
| 8,786,132 | B2 * | 7/2014 | Morita | .................. | H01M 10/44 307/66 |
| 8,863,540 | B2 * | 10/2014 | Alston | .............. | B60H 1/00428 165/43 |
| 8,890,492 | B2 * | 11/2014 | Ueno | ...................... | F02D 29/06 290/40 B |
| 8,905,166 | B2 * | 12/2014 | Dalum | .................... | B60L 50/16 180/65.22 |
| 8,978,798 | B2 * | 3/2015 | Dalum | .................... | B60K 6/12 180/65.22 |
| 8,996,227 | B2 * | 3/2015 | Sisk | ........................ | B60L 58/20 701/26 |

(56) References Cited

U.S. PATENT DOCUMENTS

| | | | | |
|---|---|---|---|---|
| 9,018,894 B2* | 4/2015 | Enoki | B60L 58/13 | 320/104 |
| 9,061,680 B2* | 6/2015 | Dalum | B60W 20/10 | |
| 9,067,483 B2* | 6/2015 | Raynor | B60K 8/00 | |
| 9,073,448 B2* | 7/2015 | King | B60L 50/61 | |
| 9,187,083 B2* | 11/2015 | Wenger | B60L 58/12 | |
| 9,254,751 B2* | 2/2016 | Yamashita | B60K 6/28 | |
| 9,254,799 B2* | 2/2016 | Yoshida | B60R 16/033 | |
| 9,260,068 B2* | 2/2016 | Ohsumi | B60K 11/06 | |
| 9,331,498 B2* | 5/2016 | Albsmeier | H02J 7/1423 | |
| 9,382,892 B2* | 7/2016 | Sakata | F02N 11/0862 | |
| 9,431,850 B2* | 8/2016 | Imai | H02J 7/1423 | |
| 9,434,262 B2* | 9/2016 | Yuhara | B60L 58/16 | |
| 9,457,671 B2* | 10/2016 | Manganaro | B60L 11/16 | |
| 9,527,401 B2* | 12/2016 | Le | H01M 10/441 | |
| 9,533,595 B2* | 1/2017 | Sakatani | H02J 7/1423 | |
| 9,627,908 B2* | 4/2017 | Kaminsky | H01M 2/10 | |
| 9,643,498 B2* | 5/2017 | Saint-Leger | H02J 7/00 | |
| 9,643,593 B2* | 5/2017 | Dalum | B60W 20/10 | |
| 9,669,724 B2* | 6/2017 | Sisk | B60L 58/26 | |
| 9,682,629 B2* | 6/2017 | Saint-Leger | B60L 1/003 | |
| 9,751,518 B2* | 9/2017 | Dalum | B60L 50/16 | |
| 9,776,517 B2* | 10/2017 | Sakata | B60R 16/033 | |
| 9,780,577 B2* | 10/2017 | Suzuki | B60L 7/12 | |
| 9,789,769 B2* | 10/2017 | Sakata | B60L 50/10 | |
| 9,802,562 B2* | 10/2017 | Yasunori | B60R 16/02 | |
| 9,809,123 B1* | 11/2017 | Botts | H01M 10/441 | |
| 9,849,793 B2* | 12/2017 | Tashiro | H02J 7/0091 | |
| 9,855,905 B2* | 1/2018 | Nakajima | B60R 16/033 | |
| 9,923,372 B2* | 3/2018 | Ishigaki | H02J 3/381 | |
| 9,935,494 B2* | 4/2018 | Rogers | B66B 1/30 | |
| 9,941,710 B2* | 4/2018 | Clay | H02J 7/0013 | |
| 9,944,299 B2* | 4/2018 | Donnelly | H02J 5/00 | |
| 9,969,292 B2* | 5/2018 | Thieme | B60K 6/28 | |
| 10,017,056 B1* | 7/2018 | Botts | B60W 20/10 | |
| 10,082,121 B2* | 9/2018 | Morita | H02J 9/002 | |
| 10,124,794 B2* | 11/2018 | Akuzawa | B60L 58/12 | |
| 10,131,293 B2* | 11/2018 | Hida | B60R 16/0207 | |
| 10,155,491 B2* | 12/2018 | Suzuki | B60L 3/0046 | |
| 10,160,341 B2* | 12/2018 | Gibson | B60L 58/12 | |
| 10,195,944 B2* | 2/2019 | Morita | B60L 50/15 | |
| 10,214,199 B2* | 2/2019 | Dalum | B60L 50/16 | |
| 10,279,758 B2* | 5/2019 | Yoneyama | B60R 16/0231 | |
| 10,279,761 B2* | 5/2019 | Taniguchi | B60R 16/033 | |
| 10,286,892 B1* | 5/2019 | Johri | B60L 3/0061 | |
| 10,320,202 B2* | 6/2019 | Le | H02J 7/1446 | |
| 10,333,337 B2* | 6/2019 | Cavanaugh | H02J 7/02 | |
| 10,536,005 B2* | 1/2020 | Yang | F02N 11/0866 | |
| 2002/0109407 A1* | 8/2002 | Morimoto | B60W 10/08 | 307/10.1 |
| 2004/0021441 A1* | 2/2004 | Komiyama | B60K 6/34 | 320/104 |
| 2004/0070372 A1* | 4/2004 | Kawai | H02J 7/1446 | 322/7 |
| 2004/0164703 A1* | 8/2004 | Berels | B60L 58/12 | 320/103 |
| 2004/0195839 A1* | 10/2004 | Kitamura | H02J 7/1407 | 290/1 R |
| 2005/0005814 A1* | 1/2005 | Kumar | B60L 7/14 | 105/35 |
| 2005/0021191 A1* | 1/2005 | Taniguchi | B60W 10/08 | 701/1 |
| 2005/0253458 A1* | 11/2005 | Omae | H02J 7/34 | 307/10.1 |
| 2006/0086547 A1* | 4/2006 | Shimada | B60L 50/61 | 180/65.245 |
| 2006/0097577 A1* | 5/2006 | Kato | F02N 11/0866 | 307/10.1 |
| 2008/0093143 A1* | 4/2008 | Harrison | B60H 1/3208 | 180/165 |
| 2008/0276824 A1* | 11/2008 | King | B60L 58/12 | 105/50 |
| 2008/0276825 A1* | 11/2008 | King | B60K 6/405 | 105/50 |
| 2008/0281479 A1* | 11/2008 | King | B60L 50/61 | 701/22 |
| 2008/0308335 A1* | 12/2008 | Anderson | B60K 1/00 | 180/165 |
| 2009/0015022 A1* | 1/2009 | Rome | A45F 3/08 | 290/1 A |
| 2009/0095549 A1* | 4/2009 | Dalum | B60K 6/12 | 180/65.265 |
| 2009/0107743 A1* | 4/2009 | Alston | H01M 10/482 | 180/65.21 |
| 2009/0127930 A1* | 5/2009 | Senda | B60R 16/03 | 307/9.1 |
| 2009/0173066 A1* | 7/2009 | Duray | B60K 6/12 | 60/413 |
| 2009/0218966 A1* | 9/2009 | Shimada | B60L 50/61 | 318/380 |
| 2009/0229288 A1* | 9/2009 | Alston | B60H 1/00428 | 62/236 |
| 2010/0184560 A1* | 7/2010 | Campbell | B60L 58/20 | 477/7 |
| 2010/0219007 A1* | 9/2010 | Dalum | B60L 50/16 | 180/65.22 |
| 2010/0308659 A1* | 12/2010 | Morita | H01M 10/44 | 307/66 |
| 2010/0312430 A1* | 12/2010 | Troncoso | B60R 16/03 | 701/31.4 |
| 2011/0260544 A1* | 10/2011 | Imai | H02J 7/1423 | 307/66 |
| 2011/0316377 A1* | 12/2011 | Warmenhoven | H02K 53/00 | 310/113 |
| 2011/0320078 A1* | 12/2011 | McGill | B60K 6/48 | 701/22 |
| 2012/0207620 A1* | 8/2012 | Dalum | B60K 6/12 | 417/44.1 |
| 2012/0256568 A1* | 10/2012 | Lee | H02J 7/0024 | 318/139 |
| 2012/0286572 A1* | 11/2012 | Tracy | H02K 53/00 | 307/19 |
| 2012/0296506 A1* | 11/2012 | Kotani | F02N 11/0866 | 701/22 |
| 2013/0018548 A1* | 1/2013 | Shimasaki | B60L 1/02 | 701/36 |
| 2013/0096754 A1* | 4/2013 | Dalum | B60L 50/16 | 701/22 |
| 2013/0249468 A1* | 9/2013 | Bajjuri | F02N 11/0866 | 320/104 |
| 2013/0264875 A1* | 10/2013 | Kaminsky | H01M 2/02 | 307/52 |
| 2013/0266824 A1* | 10/2013 | Cowperthwaite | H01M 16/00 | 429/7 |
| 2013/0266825 A1* | 10/2013 | Cowperthwaite | H01G 11/08 | 429/7 |
| 2013/0266826 A1* | 10/2013 | Cowperthwaite | H01M 2/10 | 429/7 |
| 2013/0320931 A1* | 12/2013 | Yoshida | B60R 16/0307 | 320/135 |
| 2014/0062414 A1* | 3/2014 | Yuhara | B60L 58/16 | 320/134 |
| 2014/0067183 A1* | 3/2014 | Sisk | B60L 50/66 | 701/22 |
| 2014/0070760 A1* | 3/2014 | Albsmeier | H02J 7/1423 | 320/107 |
| 2014/0077771 A1* | 3/2014 | Yamashita | B60L 1/00 | 320/167 |
| 2014/0171260 A1* | 6/2014 | Dalum | B60W 20/10 | 477/5 |
| 2014/0184153 A1* | 7/2014 | Saint-Leger | H02J 7/00 | 320/108 |
| 2014/0244082 A1* | 8/2014 | Caron | B60W 10/08 | 701/22 |
| 2014/0256505 A1* | 9/2014 | Dalum | B60K 6/12 | 477/3 |
| 2014/0361611 A1* | 12/2014 | Saint-Leger | B60L 1/003 | 307/10.1 |
| 2015/0032301 A1* | 1/2015 | Lamba | B61C 7/04 | 701/19 |

(56) References Cited

U.S. PATENT DOCUMENTS

| | | | |
|---|---|---|---|
| 2015/0060172 A1* | 3/2015 | Manganaro | B60L 50/30 180/165 |
| 2015/0158483 A1* | 6/2015 | Dalum | B60L 50/16 701/22 |
| 2015/0175152 A1* | 6/2015 | Dalum | B60K 6/12 477/3 |
| 2015/0232049 A1* | 8/2015 | Ohsumi | B60R 16/04 180/68.1 |
| 2015/0239411 A1* | 8/2015 | Nakajima | B60R 16/033 307/10.6 |
| 2015/0275841 A1* | 10/2015 | Sakata | F02N 11/0862 123/179.28 |
| 2015/0283991 A1* | 10/2015 | Dalum | B60W 20/10 701/22 |
| 2015/0291039 A1* | 10/2015 | Sakata | B60L 50/10 307/10.1 |
| 2015/0298556 A1* | 10/2015 | Sakata | B60L 50/50 307/10.1 |
| 2015/0298557 A1* | 10/2015 | Sakata | B60R 16/033 307/10.1 |
| 2015/0321575 A1* | 11/2015 | Sakatani | H02J 7/1423 320/109 |
| 2015/0329007 A1* | 11/2015 | Matsunaga | H01M 10/441 320/126 |
| 2015/0340884 A1* | 11/2015 | Suzuki | B60L 7/12 320/107 |
| 2016/0016483 A1* | 1/2016 | Yasunori | B60L 15/2009 320/162 |
| 2016/0039370 A1* | 2/2016 | Suzuki | B60L 58/20 307/10.1 |
| 2016/0089992 A1* | 3/2016 | Le | H02J 7/0003 320/107 |
| 2016/0137092 A1* | 5/2016 | Thieme | F02N 11/0866 307/10.6 |
| 2016/0236581 A1* | 8/2016 | Tashiro | B60L 58/14 |
| 2016/0282832 A1* | 9/2016 | Ishigaki | H02J 3/381 |
| 2016/0336624 A1* | 11/2016 | Gu | B60L 58/15 |
| 2016/0361984 A1* | 12/2016 | Manganaro | B60L 58/10 |
| 2016/0361985 A1* | 12/2016 | Manganaro | B60L 11/16 |
| 2016/0362007 A1* | 12/2016 | Manganaro | B60K 1/04 |
| 2016/0362008 A1* | 12/2016 | Manganaro | B60K 6/30 |
| 2016/0362009 A1* | 12/2016 | Manganaro | B60L 1/006 |
| 2017/0080883 A1* | 3/2017 | Yasunori | B60R 16/02 |
| 2017/0141589 A1* | 5/2017 | Inoue | H02J 7/1423 |
| 2017/0155273 A1* | 6/2017 | Johnson | H02J 9/02 |
| 2017/0197565 A1* | 7/2017 | Yoneyama | B60R 16/0231 |
| 2017/0225586 A1* | 8/2017 | Zhang | B60L 11/1861 |
| 2017/0225635 A1* | 8/2017 | Obayashi | G01R 19/16533 |
| 2017/0341517 A1* | 11/2017 | Morita | B60L 50/15 |
| 2017/0342953 A1* | 11/2017 | Morita | F02N 11/087 |
| 2017/0355327 A1* | 12/2017 | Hida | B60R 16/0207 |
| 2017/0355373 A1* | 12/2017 | Dalum | B60W 20/10 |
| 2017/0366017 A1* | 12/2017 | Clay | H02J 7/1438 |
| 2018/0009431 A1* | 1/2018 | Akuzawa | B60L 58/12 |
| 2018/0015891 A1* | 1/2018 | Taniguchi | B60R 16/033 |
| 2018/0022338 A1* | 1/2018 | Dalum | B60L 50/16 701/22 |
| 2018/0041048 A1* | 2/2018 | Yang | F02D 41/065 |
| 2018/0093656 A1* | 4/2018 | Yamazaki | B60K 6/26 |
| 2018/0118048 A1* | 5/2018 | Gibson | B60L 58/20 |
| 2018/0134176 A1* | 5/2018 | Symanow | B60L 58/20 |
| 2018/0167002 A1* | 6/2018 | Frampton | H02J 7/022 |
| 2018/0226905 A1* | 8/2018 | Botts | B60L 7/18 |
| 2018/0229614 A1* | 8/2018 | Suzuki | B60L 53/00 |
| 2018/0241225 A1* | 8/2018 | Shirai | B60L 58/12 |
| 2018/0257506 A1* | 9/2018 | Thieme | B60L 1/00 |
| 2018/0272968 A1* | 9/2018 | Yasunori | B60R 16/033 |
| 2018/0290607 A1* | 10/2018 | Hida | H02J 7/342 |
| 2018/0290608 A1* | 10/2018 | Hida | H02J 7/1423 |
| 2018/0335007 A1* | 11/2018 | Shields | B60L 3/04 |
| 2019/0013664 A1* | 1/2019 | Yasunori | B60R 16/033 |
| 2019/0054870 A1* | 2/2019 | Hida | H02J 7/1423 |
| 2019/0071038 A1* | 3/2019 | Maekawa | B60R 16/033 |
| 2019/0071039 A1* | 3/2019 | Tsukamoto | H02J 7/342 |
| 2019/0074779 A1* | 3/2019 | Frampton | H02P 27/08 |
| 2019/0081502 A1* | 3/2019 | Botts | H02K 19/18 |
| 2019/0103629 A1* | 4/2019 | Koike | H01M 10/0525 |
| 2019/0123545 A1* | 4/2019 | Maekawa | H02J 7/00 |
| 2019/0143957 A1* | 5/2019 | Dalum | B60K 6/12 |
| 2019/0160972 A1* | 5/2019 | Zeiler | B60K 1/04 |
| 2019/0199248 A1* | 6/2019 | Botts | B60T 8/17 |
| 2019/0256076 A1* | 8/2019 | Roiu | B60L 7/10 |
| 2019/0267831 A1* | 8/2019 | Cavanaugh | H02J 7/0014 |
| 2019/0296561 A1* | 9/2019 | Le | H02J 7/0003 |

FOREIGN PATENT DOCUMENTS

| | | | | |
|---|---|---|---|---|
| JP | 5392180 B2 | | 1/2014 | |
| JP | 2015-076959 A | | 4/2015 | |
| JP | 6111967 B2 | * | 4/2017 | |
| WO | WO-2017043641 A1 | * | 3/2017 | B60R 16/033 |
| WO | WO-2017069096 A1 | * | 4/2017 | H02J 1/14 |

\* cited by examiner

DUAL ENERGY STORE AND DUAL CHARGING SOURCE VEHICLE POWER SUPPLY SYSTEM AND VEHICLE DRIVE SYSTEM

This application is the U.S. National Phase of PCT/JP2017/009192 filed Mar. 8, 2017, which claims priority to JP 2016-052195 filed Mar. 16, 2016, the entire disclosure of which is incorporated herein by reference.

BACKGROUND

The present disclosure relates to a vehicle power supply system and a vehicle drive system.

In recent years, the electrical motorization of loads mounted on vehicles (hereinafter referred to as "vehicle-mounted loads") has progressed. For example, in order to enhance comfort and design, sometimes functions such as the parking brake and the parking lock (locking of the gearshift in the parking range) are also electrically motorized.

While the functions of the parking brake and the parking lock are essential to safely lock a vehicle in a stationary state, if these are electrically motorized, the supply of power (referred to also as "power feed" hereinafter) needs to be maintained to maintain these functions. That is, even if there is a power supply failure, power needs to be fed to realize these functions.

From such a point of view, JP 5392180 listed below proposes technology to detect a lack of charge in the power source and automatically move the gearshift to the parking range using the remaining electric power upon the vehicle speed reaching a vehicle speed at which the gearshift can be moved to the parking range, before the minimum voltage to operate the parking lock is reached.

SUMMARY

However, cases can also be conceived in which the power source that feeds power to the vehicle-mounted loads may not only lack in charge but also completely fail due to a short circuit within a battery, for example. The method proposed in the above-described JP 5392180 cannot maintain the power feed in such cases. Moreover, it is preferable that the gearshift can be moved to the parking range by an operation made by the user.

An exemplary aspect of the disclosure provides technology that enables operation of a control load and an actuator even after the power source has failed and the vehicle has stopped, allowing the actuator to perform important operations such as moving the gearshift to the parking range.

The vehicle power supply system according to a first aspect supplies power to an actuator and a control load mounted on a vehicle. The vehicle power supply system comprises: an alternator; a first electrical storage device that is charged by the alternator; a power generator that generates power in conjunction with traveling of the vehicle; a second electrical storage device that is charged by the power generator; a charge path used to charge the second electrical storage device from the power generator; a first power feed path for feeding power to the actuator from the first electrical storage device; a second power feed path for feeding power to the actuator from the second electrical storage device; a third power feed path for feeding power to the control load from the first electrical storage device; a fourth power feed path for feeding power to the control load from the second electrical storage device; a first switch provided in the first power feed path; and a second switch provided in the second power feed path. The opening and closing of the first switch and the second switch is controlled by the control load.

The vehicle power supply system according to a second aspect is the first aspect that further comprises a rectifier circuit provided in the charge path. The power generator is an alternating current generator, and the rectifier circuit rectifies and inputs the output of the power generator to the second electrical storage device.

The vehicle power supply system according to a third aspect is the second aspect in which the second electrical storage device is an accumulator.

The vehicle power supply system according to a fourth aspect is the third aspect that further comprises a DC/DC converter provided between the rectifier circuit and the second electrical storage device. The DC/DC converter transforms and inputs the voltage output by the rectifier circuit to the second electrical storage device.

The vehicle power supply system according to a fifth aspect is the first aspect or the second aspect that further comprises a DC/DC converter provided between the second power feed path and the fourth power feed path, and the second electrical storage device. The second electrical storage device is a capacitor. The DC/DC converter transforms and supplies the voltage output by the second electrical storage device to the second power feed path and the fourth power feed path.

The vehicle power supply system according to a sixth aspect is any one of the first to fifth aspects in which, if the first electrical storage device fails, the first switch becomes non-conductive.

The vehicle power supply system according to a seventh aspect is the sixth aspect in which the second switch becomes conductive when a vehicle speed reaches a predetermined threshold value.

The vehicle drive system according to an eighth aspect comprises any one of the first to seventh aspects and the actuator.

According to the first aspect, even if the first electrical storage device fails, the control load and the actuator are both fed power by the second electrical storage device. Furthermore, as the second electrical storage device is charged by the power generator, which generates power in conjunction with traveling of the vehicle, charging of the second electrical storage device is maintained even if the failure of the first electrical storage device is due to a short circuit and the alternator is disabled. Accordingly, the control load and the actuator can operate even after the power source has failed and the vehicle has stopped, and the actuator can perform important operations such as moving the gearshift to the parking range.

According to the second aspect, the second electrical storage device can be charged even if the power generator is an alternating power generator.

According to the third aspect, a stable voltage is discharged from the second electrical storage device.

According to the fourth aspect, the second electrical storage device can be charged at a voltage suitable for the accumulator, i.e., the second electrical storage device.

According to the fifth aspect, even if the voltage of the capacitor, i.e., the second electrical storage device, is lowered due to being discharged, the load and the actuator can be fed power at suitable voltages.

According to the sixth aspect, the second electrical storage device is isolated from a failure of the first electrical storage device by the first switch.

According to the seventh aspect, the actuator can operate when the vehicle speed of the vehicle reaches a predetermined threshold value, allowing the actuator to perform important operations such as moving the gearshift to the parking range.

DETAILED DESCRIPTION OF EMBODIMENTS

Prior to describing the embodiments of the present disclosure, technology that is to be compared to these embodiments (comparative example), although not disclosed in JP 5392180, will be described.

Figure 3:
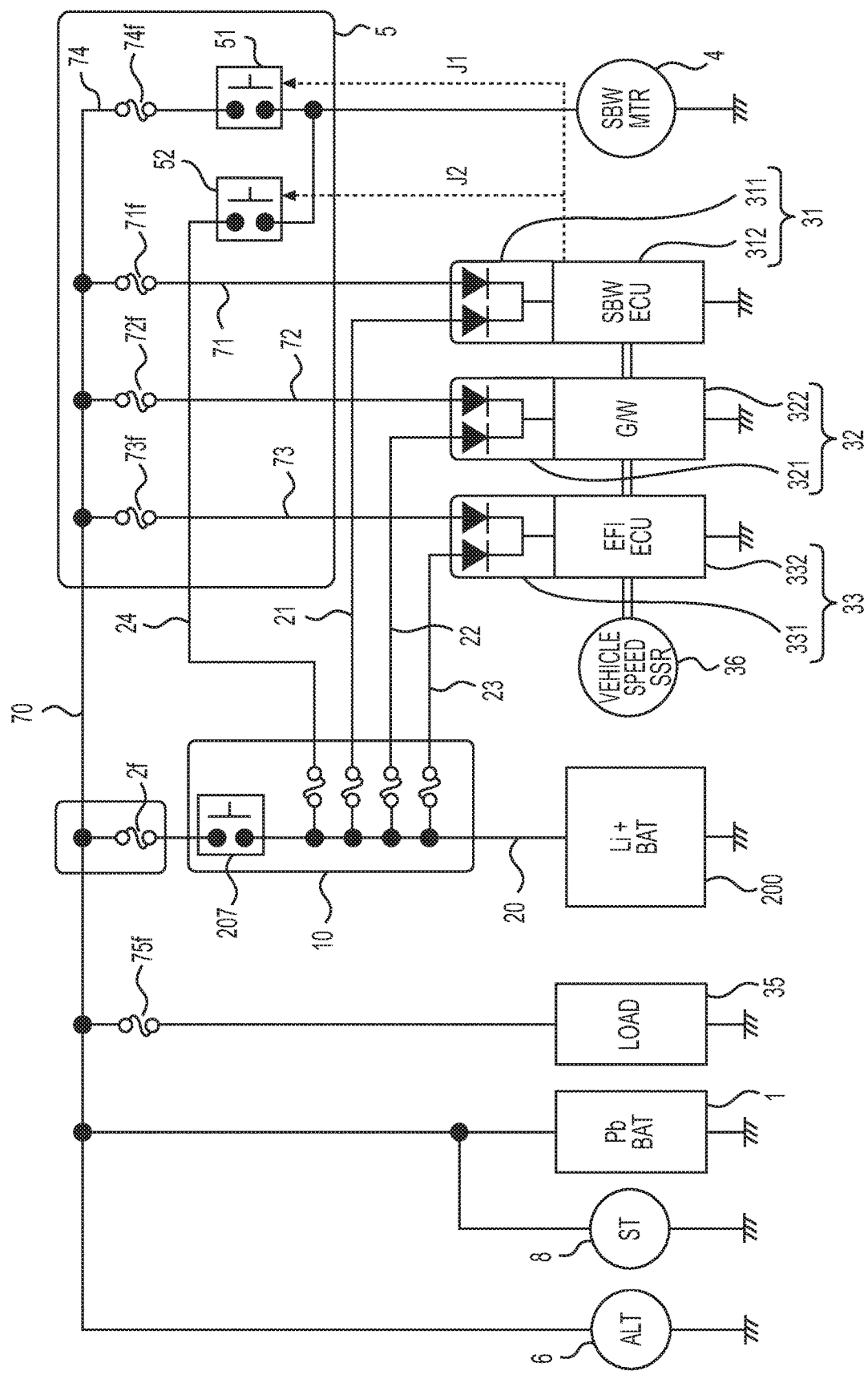
FIG. 3 is a block diagram showing the technology of a comparative example of the prior art with respect to the first embodiment and the second embodiment.

FIG. 3 is a block diagram showing technology that is the comparative example. A battery unit 1 can be charged by an alternator 6 (denoted as "ALT" in the figure) via a power source main line 70. A first electrical storage device 1 serves the function of driving a starter 8 (denoted as "ST" in the figure) for starting the engine (not shown) while serving the function of feeding power to other components via the power source main line 70. In view of these functions, for example, a lead battery (denoted as "Pb BAT" in the figure) is employed as the first electrical storage device 1.

Connected to the power source main line 70 via a relay box 5 are loads such as a shift-by-wire ECU 312 (denoted as "SBW ECU" in the figure: "ECU" stands for "electronic control unit"), a gateway 322 (denoted as "G/W" in the figure), an electronically controlled fuel injection ECU 332 (denoted as "EFI ECU" in the figure), and an actuator 4 (for example, a shift-by-wire motor: denoted as "SBW MTR" in the figure).

The shift-by-wire ECU 312 and the electronically controlled fuel injection ECU 332 can communicate with each other via the gateway 322. In the drawing, this communication is indicated by a double line.

In the comparative example, a second electrical storage device 200 is provided to maintain the power feed to the actuator 4 even if the first electrical storage device 1 fails. The shift-by-wire ECU 312, the gateway 322, and the electronically controlled fuel injection ECU 332 are also connected to the second electrical storage device 200 via power source branch lines 21, 22, and 23, respectively. A power source main line 20 is connected to the second electrical storage device 200. The power source branch lines 21, 22, and 23 are connected to the power source main line 20. A fuse is provided in each of the power source branch lines 21, 22, and 23. These fuses and part of the power source main line 20 are provided in a relay box 10.

Specifically, the shift-by-wire ECU 312 is connected to the power source branch lines 21 and 71 via a diode pair 311; the gateway 322 is connected to the power source branch lines 22 and 72 via a diode pair 321; and the electronically controlled fuel injection ECU 332 is connected to the power source branch lines 23 and 73 via a diode pair 331. The power source branch lines 71, 72, and 73 are provided with fuses 71$f$, 72$f$, and 73$f$, respectively. The power source branch lines 71, 72, and 73 are all connected to the first electrical storage device 1 via the power source main line 70. The fuses 71$f$, 72$f$, and 73$f$ are contained in the relay box 5.

The second electrical storage device 200 is connected to the power source main line 70 via a fuse 2$f$ and a switch 207. The switch 207 is provided in the relay box 10, and the fuse 2$f$ is provided between the switch 207 and the power source main line 70. The switch 207 is turned on (conductive), for example, when the second electrical storage device 200 is charged by the electric power generated by a alternator 6 during a regenerative operation. Preferably, a lithium ion battery (denoted as "Li+BAT" in the figure), a nickel hydrogen battery, or a capacitor, such as an electric double layer capacitor, etc., is employed as the second electrical storage device 200 due to their suitability for such charging.

The diode pair 311 includes a pair of diodes and their cathodes are commonly connected to the power feed end of the shift-by-wire ECU 312. Their anodes are respectively connected to the fuse 71$f$ and the power source branch line 21. The diode pair 311 and the shift-by-wire ECU 312 can be collectively considered as a load 31. The load 31 serves to function as a control load that controls the operations of the actuator 4.

The diode pair 321 includes a pair of diodes and their cathodes are commonly connected to the power feed end of the gateway 322. Their anodes are respectively connected to the fuse 72$f$ and the power source branch line 22. The diode pair 321 and the gateway 322 can be collectively considered as a load 32.

The diode pair 331 includes a pair of diodes and their cathodes are commonly connected to the power feed end of the electronically controlled fuel injection ECU 332. Their anodes are respectively connected to the fuse 73$f$ and the power source branch line 23. The diode pair 331 and the electronically controlled fuel injection ECU 332 can be collectively considered as a load 33.

Here, it is assumed that, in the feeding of power to the aforementioned power feed ends, an electric current flows in from both the first electrical storage device 1 and the second electrical storage device 200. Therefore, if the design is such that an electric current flows to both the first electrical storage device 1 and the second electrical storage device 200 from the power feed ends while feeding power, the connection of the anodes and the cathodes are switched in each of the diode pairs 311, 321, and 331.

The actuator 4 can also be fed power from either of the first electrical storage device 1 and the second electrical storage device 200. Specifically, the actuator 4 is connected to the power source branch line 74 via a switch 51 and connected to the power source branch line 24 via a switch 52.

A fuse 74$f$ is provided in the power source branch line 74. The fuse 74$f$ is also contained in the relay box 5. The power source branch line 74 is connected to the power source main line 70.

The power source branch line 24 is connected to the power source main line 20 and a fuse is provided in the power source branch line 24. This fuse is provided in the relay box 10. The switches 51 and 52 are contained in the relay box 5. Relays can be employed as the switches 51, 52, and 207.

Due to the presence of the diode pairs 311, 321, and 331 and due to the operations of the switches 51 and 52, redundancy is provided for the power feed to the shift-by-wire ECU 312, the gateway 322, the electronically controlled fuel injection ECU 332, and the actuator 4. In other words, the aforementioned power feed is possible from either of the first electrical storage device 1 and the second electrical storage device 200.

It should be noted that, while a load 35 is connected to the power source main line 70 via a fuse 75*f*, the switch 207 is not turned on if the first electrical storage device 1 fails as described below, and there is no power feed redundancy for the load 35.

According to the comparative example, even if the first electrical storage device 1 completely fails, for example, due to an internal short circuit (in this case, a ground fault occurs in the power source main line 70 and the power source branch lines 71, 72, 73, and 74), the second electrical storage device 200 can feed power to the shift-by-wire ECU 312, the gateway 322, and the electronically controlled fuel injection ECU 332 while avoiding the ground fault by turning off (non-conducting) the switch 207.

Specifically, due to the presence of the diode pairs 311, 321, and 331, a current is prevented from flowing to the power source branch line 74 from the power source branch lines 21, 22, and 23, thus avoiding a ground fault in the second electrical storage device 200 via the power source main line 70 and the power source branch lines 71, 72, and 73. By turning off the switch 51, the second electrical storage device 200 avoids the ground fault via the power source branch line 74.

In addition, by turning on the switch 52, the second electrical storage device 200 can feed power to the actuator 4 via the power source branch line 24 to drive the actuator 4.

This turning on/off of the switches 51 and 52 is performed by control signals J1 and J2, respectively. The control signals J1 and J2 are obtained from the load 31, more specifically, from the shift-by-wire ECU 312. The shift-by-wire ECU 312 sets the control signals J1 and J2 based on an instruction from an unshown outside unit, for example, made by the user to indirectly control the operations of the actuator 4.

According to this configuration, in the event of a failure in the first electrical storage device 1, the functions of the shift-by-wire ECU 312, the gateway 322, the electronically controlled fuel injection ECU 332, and the actuator 4 are maintained. However, the alternator 6 ceases to charge the second electrical storage device 200. This is because the switch 207 isolates the second electrical storage device 200 from the power source main line 70 (in which a ground fault has occurred) and also because a ground fault has occurred in the alternator 6 due to the first electrical storage device 1.

In view of these circumstances, in order to operate the actuator 4 to move the gearshift to the parking range, the power feed from the second electrical storage device 200 to a region including the shift-by-wire ECU 312 needs to be maintained until the upper limit speed is reached at which the aforementioned operation is possible (referred to as "critical speed" hereinafter: for example, 5 km). In other words, it is necessary to determine whether or not the speed has reached the critical speed.

Normally, a vehicle speed monitor 36 for measuring the vehicle speed (denoted as "vehicle speed SSR" in the figure) transmits a signal including information about the vehicle speed to the electronically controlled fuel injection ECU 332. The aforementioned determination is possible based on the information obtained from the vehicle speed monitor 36.

However, it is difficult to estimate the time it takes for the vehicle speed to reach the critical speed after a failure has occurred in the first electrical storage device 1. If the power feed to the shift-by-wire ECU 312 and the actuator 4 is to be secured in order to address difficulty in the estimation, the size of the second electrical storage device 200 is increased in order to increase its current carrying capacity and becomes expensive.

First Embodiment

Figure 1:
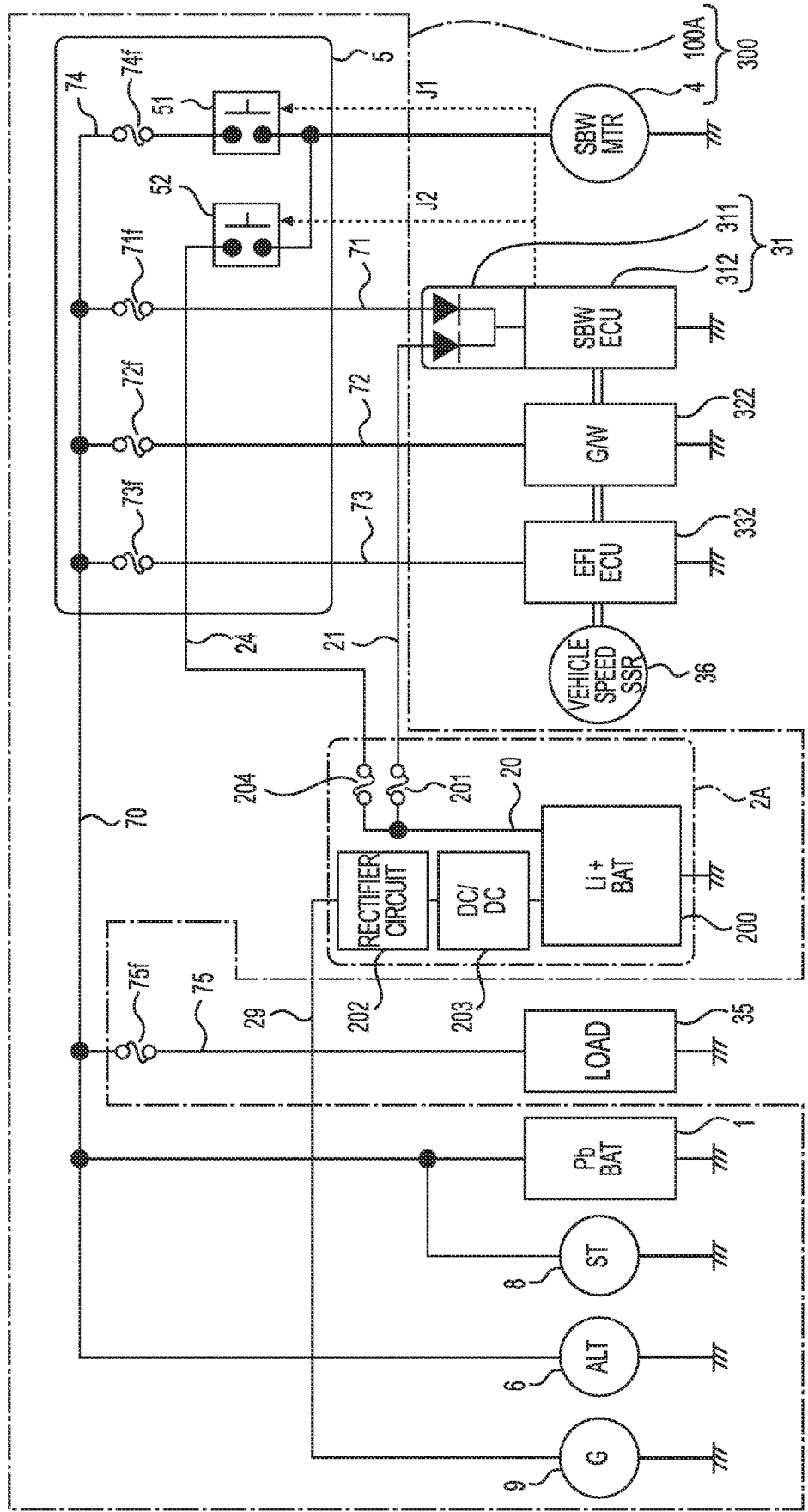
FIG. 1 is a block diagram showing a vehicle power supply system according to a first embodiment.

A vehicle power supply system according to a first embodiment will be described. FIG. 1 is a block diagram showing the configuration of a vehicle power supply system 100A according to the first embodiment. It should be noted that, in the description of this embodiment and the second embodiment, the components identical to those described in the comparative example are assigned identical reference numerals and a description thereof is omitted.

The vehicle power supply system 100A supplies power (i.e., feeds power) to an actuator 4 and a load 31, which are mounted on the vehicle. This vehicle power supply system 100A includes a first electrical storage device 1, a second electrical storage device 200, a power generator 9 (denoted as "G" in the figure), power source branch lines 21, 24, 71, and 74 that are power feed paths, and switches 51 and 52, all mounted on the vehicle. As in the comparative example, the switches 51 and 52 are contained in a relay box 5.

The power generator 9 is connected to a power line 29 to generate power in conjunction with traveling of the vehicle on which the vehicle power supply system 100A is mounted. The second electrical storage device 200 is charged by the power generator 9 with the power line 29 acting as the charging path.

The power source branch line 74 is used to feed power from the first electrical storage device 1 to the actuator 4 via the power source main line 70. More specifically, as in the comparative example, the switch 51 is interposed between the power source branch line 74 and the actuator 4. By turning on the switch 51, the actuator 4 is fed power from the first electrical storage device 1 and driven.

In this embodiment, as in the comparative example, although a fuse 74*f* is provided in the power source branch line 74, the fuse 74*f* is not a necessity in this embodiment. As it is considered that the power source branch line 74 also includes a portion of the switch 51 on the actuator 4 side, the switch 51 can be taken as a switch provided in the power source branch line 74 to perform opening and closing (on/off).

The power source branch line 24 is used to feed power from the second electrical storage device 200 to the actuator 4. More specifically, as in the comparative example, a switch 52 is interposed between the power source branch line 24 and the actuator 4. With the switch 52 turned ON, the actuator 4 is fed power from the second electrical storage device 200 and driven.

In this embodiment, as in the comparative example, although a fuse 204 is provided in the power source branch line 24, the fuse 204 is not a necessity in this embodiment. As it is considered that the power source branch line 24 includes a portion of the switch 52 on the actuator 4 side, the switch 52 can be taken as a switch provided in the power source branch line 24 to perform opening and closing (on/off).

The control signals J1 and J2 are obtained from the load 31, more specifically, from the shift-by-wire ECU 312, and allow conduction through the switches 51 and 52, respectively.

As in the comparative example, the load 31 is fed power from the first electrical storage device 1 via the power source branch line 71 and from the second electrical storage device 200 via the power source branch line 21. Although a fuse 201 is interposed between the power source branch line 21 and the second electrical storage device 200, the fuse 201 is not a necessity in this embodiment.

The same connection relationship between the first electrical storage device 1, the alternator 6, the loads 35, and the power source main line 70 as in the comparative example is employed, with a starter 8 being connected to the first electrical storage device 1.

In this embodiment and the second embodiment, unlike the comparative example, the second electrical storage device 200 is charged by the power generator 9 via the power line 29, rather than by the alternator 6 via the power source main line 70. Accordingly, the fuse 2f and the switch 207, which are employed in the comparative example, are not employed.

Additionally, in this embodiment and the second embodiment, unlike the comparative example, the gateway 322 and the electronically controlled fuel injection ECU 332 are fed power by the power source branch lines 72 and 73, respectively, but not necessarily by the second electrical storage device 200. Here, a case is illustrated in which the gateway 322 and the electronically controlled fuel injection ECU 332 are not fed power by the second electrical storage device 200.

Therefore, the power source branch lines 22 and 23 and the fuses that were interposed between these and the second electrical storage device 200 are not employed in this embodiment and the second embodiment. Accordingly, the diode pairs 321 and 331 are not employed either.

While the first electrical storage device 1 is charged by the alternator 6, an internal short circuit effectively disables the function of the alternator 6. However, in this embodiment, even if the first electrical storage device 1 fails, the second electrical storage device 200 feeds power to the shift-by-wire ECU 312 and can also feed power to the actuator 4. Moreover, the power generator 9, which charges the second electrical storage device 200, performs charging in conjunction with traveling of the vehicle. Therefore, even if the failure of the first electrical storage device 1 is due to a short circuit and the alternator 6 is disabled, the feeding of power to the second electrical storage device 200 is maintained.

That is to say, even if the first electrical storage device 1, which is one of the power sources, fails, the shift-by-wire ECU 312 and the actuator 4 can be operated after the vehicle has stopped. The actuator 4 can be caused to perform important operations such as moving the gearshift to the parking range.

It should be noted that, to be more precise, the power generator 9 preferably generates power even when the vehicle speed is the critical vehicle speed. This is because, if the power generator 9 stops generating power at a speed higher than the critical vehicle speed, the second electrical storage device 200 cannot be charged. However, when the vehicle is traveling at about the critical vehicle speed, the transmission ratio of the vehicle is usually small, thus providing the power generator 9 with rotations at a sufficient rotational speed for power generation.

If the power generator 9 is an alternating current generator, the generated voltage needs to be converted to a direct current as in the alternator 6. This is because the second electrical storage device 200 needs to be charged with a direct current. In this embodiment and the second embodiment, a rectifier circuit 202 is provided in the power line 29, assuming that the power generator 9 is an alternating current generator. The rectifier circuit 202 rectifies the output of the power generator 9 and inputs it to the second electrical storage device 200. In other words, by providing the rectifier circuit 202, the second electrical storage device 200 can be charged even if an alternating current generator is employed as the power generator 9.

In this embodiment as in the comparative example, a case in which an accumulator (a so-called battery) is employed as the second electrical storage device 200 is described. Here, a case in which a lithium ion battery is employed as the second electrical storage device 200 is illustrated. Alternatively, a nickel hydrogen battery may be employed as the second electrical storage device 200. However, a case in which a capacitor, rather than an accumulator, is employed as the second electrical storage device 200 will be described in the second embodiment.

The following describes operations in more detail. The voltage obtained through power generation by the power generator 9 is provided to a DC/DC converter 203 (denoted as "DC/DC" in the figure) after being rectified by the rectifier circuit 202. The DC/DC converter 203 is provided between the rectifier circuit 202 and the second electrical storage device 200. The DC/DC converter 203 transforms and inputs the voltage output by the rectifier circuit 202 to the second electrical storage device 200. Due to this function of the DC/DC converter 203, the second electrical storage device 200 can be charged at a voltage suitable for the accumulator, i.e., the second electrical storage device 200.

Therefore, if the voltage provided by the DC/DC converter 203 to the second electrical storage device 200 is no less than the output voltage output by the second electrical storage device 200, the amount of stored electricity in the second electrical storage device 200 does not decrease. On the other hand, the amount of stored electricity in the second electrical storage device 200 decreases if the voltage after being transformed is less than the aforementioned output voltage.

In this embodiment, the operating power source of the DC/DC converter 203 is preferably supplied from both the first electrical storage device 1 and the second electrical storage device 200 from the viewpoint of not consuming power from the second electrical storage device 200 during normal operation and due to the need to operate if the first electrical storage device 1 fails. The feeding of power with such redundancy can be achieved by using diode pairs as shown by the comparative example (not shown).

When neither the first electrical storage device 1 and the second electrical storage device 200 has failed, the shift-by-wire ECU 312 and the actuator 4 can also be fed power from either of the first electrical storage device 1 and the second electrical storage device 200. Specifically, when driving the actuator 4, the control signal J1 or J2 is used to turn on one (or maybe both) of the switches 51 and 52. The gateway 322 and the electronically controlled fuel injection ECU 332 are fed power by the first electrical storage device 1. Therefore, the amount of stored electricity in the second electrical storage device 200 does not decrease.

If the first electrical storage device 1 fails, the shift-by-wire ECU 312 is fed power by the second electrical storage device 200. The shift-by-wire ECU 312 is notified of such a failure by a known technique (for example, a different unshown ECU detects a failure of the first electrical storage device 1 and information about it is communicated to the shift-by-wire ECU 312 via the gateway 322). This allows the shift-by-wire ECU 312 to turn ON the switch 52 via the control signal J2.

Even in this situation, the second electrical storage device 200 can be charged as long as the vehicle is traveling. Therefore, even if the vehicle slows down due to a separate operation, due to the power being fed from the second electrical storage device 200, the actuator 4 can be operated under the control of the shift-by-wire ECU 312 to move the gearshift to the parking range.

This control can be carried out based on an operation made by the user on shift-by-wire ECU 312. For example, when the vehicle speed of the vehicle on which the vehicle power supply system 100A is mounted reaches the critical speed after receiving a shift operation made by the user, the control signal J2 for establishing conduction through the switch 52 is generated. This allows the actuator 4 to perform important operations such as moving the gearshift to the parking range. That is to say, the critical speed can be considered as a predetermined threshold value as to whether or not to establish conduction through the switch 52.

However, the switch 51 is turned OFF. This is because, if the switch 51 is turned on when the first electrical storage device 1 fails, the second electrical storage device 200 cannot effectively feed power to the actuator 4 by turning on the switch 52. In other words, the second electrical storage device 200 is disconnected by the switch 51, which is turned off, from the power source branch line 74 and thus from the power source main line 70, so that it is isolated from the failure in the first electrical storage device 1.

In this embodiment, the second electrical storage device 200, the fuses 201 and 204, the rectifier circuit 202, and the DC/DC converter 203 can be arranged collectively as a power source unit 2A. Alternatively, instead of including the rectifier circuit 202 in the power source unit 2A, the power generator 9 and the rectifier circuit 202 may be combined to construct a different alternator from the alternator 6.

Second Embodiment

Figure 2:
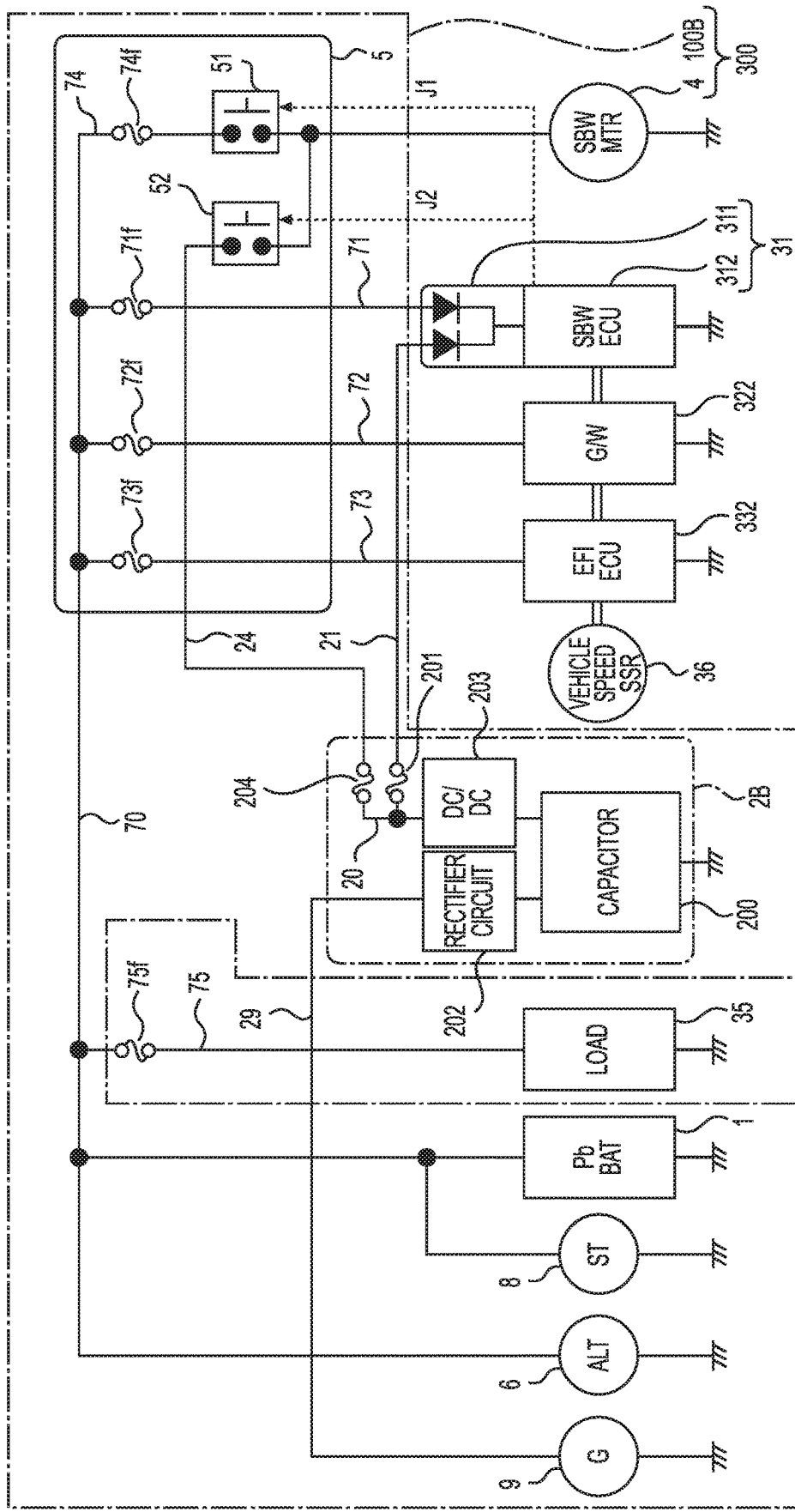
FIG. 2 is a block diagram showing a vehicle power supply system according to a second embodiment.

FIG. 2 is a block diagram showing a vehicle power supply system according to the second embodiment. In the description of this embodiment, the components identical to those described in the comparative example and the first embodiment are assigned identical reference numerals and a description thereof is omitted.

A vehicle power supply system 100B according to the second embodiment differs from the vehicle power supply system 100A according to the first embodiment in that a capacitor is employed in the second electrical storage device 200. Due to this difference, the DC/DC converter 203 is arranged between the second electrical storage device 200 and the power source branch lines 21 and 24, more specifically, between the second electrical storage device 200 and the fuses 201 and 204. In this embodiment, therefore, the voltage output by the rectifier circuit 202 is applied to the second electrical storage device 200. The rest of the configuration is the same as the first embodiment.

Unlike accumulators, the voltage of capacitors during charging and discharging is determined by their capacitance and the amount of charge. Accordingly, during charging, the higher the voltage is during charging, the larger the charging amount becomes, and during discharging, the voltage during discharge decreases as the charging amount decreases.

To adapt to the characteristics of such capacitors, in this embodiment, the rectifier circuit 202 is provided in the charge path of the second electrical storage device 200 while the DC/DC converter 203 is not. Meanwhile, the DC/DC converter 203 is provided in the discharge path to transform the voltage of the second electrical storage device 200 to the desired voltage to be fed to the shift-by-wire ECU 312 and the actuator 4 and supply the voltage to the power source branch lines 21 and 24. In view of such discharging, the vehicle power supply system 100A according to the first embodiment is more advantageous as it can discharge at a stable voltage due to the accumulator employed in the second electrical storage device 200.

As described above, the DC/DC converter 203 is not employed to charge the second electrical storage device 200. Therefore, if the voltage of the second electrical storage device 200 is higher than the voltage generated by the power generator 9, the second electrical storage device 200 is not charged but exclusively discharged.

Also in this embodiment, as in the first embodiment, the second electrical storage device 200 can be charged as long as the vehicle is traveling. Therefore, even if the vehicle is slowed down by a separate operation, the actuator 4 can be operated under the control of the shift-by-wire ECU 312 to move the gearshift to the parking range.

In this embodiment, the second electrical storage device 200, the fuses 201 and 204, the rectifier circuit 202, and the DC/DC converter 203 may also be arranged collectively as a power source unit 2B. Alternatively, instead of including the rectifier circuit 202 in the power source unit 2B, the power generator 9, and the rectifier circuit 202 may be combined to construct a different alternator from the alternator 6.

Variations

In the first embodiment, the gearshift may be moved to the parking range by the actuator 4 based on the determination by the shift-by-wire ECU 312 itself. One example of this may be control whereby the shift-by-wire ECU 312 monitors the voltage input to itself and operates the actuator 4 when the voltage approaches the lower limit at which the actuator 4 can be operated. This is because, as described above, if the voltage from the DC/DC converter 203 after being transformed is below the output voltage of the second electrical storage device 200, the amount of stored electricity in the second electrical storage device 200 decreases.

Moreover, in the first embodiment, it is desirable that the DC/DC converter 203 stops when the transformed voltage from the DC/DC converter 203 is about the voltage obtained at the critical speed. This is because the DC/DC converter 203, which stops in this manner, can be more inexpensively implemented compared to those that still operate even when the transformed voltage is about the voltage obtained at the critical speed.

Alternatively, if the power generator 9 generates a high enough voltage to be able to charge the second electrical storage device 200 at the critical speed, the DC/DC converter 203 may also be omitted in the first embodiment. This is because the voltage generated by the power generator 9 at no less than the critical speed is capable of charging the second electrical storage device 200. Such omission of the DC/DC converter 203 is desirable considering that the power source unit 2A can be inexpensively implemented. In this case, if the power generator 9 is an alternating current generator, the second electrical storage device 200 is provided with the output of the rectifier circuit 202, and if the power generator 9 is a direct current generator, the second electrical storage device 200 is provided with the output of the power generator 9.

Also in the second embodiment, if the power generator 9 is a direct current generator, the second electrical storage device 200 is provided with the output of the power generator 9.

Additionally, in the second embodiment, it is desirable that the voltage of the second electrical storage device 200 be monitored by an ECU for monitoring the battery (not shown) and that the shift-by-wire ECU 312 be notified of that voltage via the gate way 322. This is because, as the voltage fed to the shift-by-wire ECU 312 is the voltage after being transformed by the DC/DC converter 203, this does not allow for the determination of the voltage of the second electrical storage device 200. Then, when the voltage of the second electrical storage device 200 approaches the lower limit at which the actuator 4 can be operated, the shift-by-wire ECU 312 performs control to operate the actuator 4.

It should be noted that each of the elements described with respect to each of the foregoing embodiments and each of the variants may be combined as required as long as they are compatible with one another.

Additionally, as the actuator 4 controls the driving of the vehicle, this can be combined with the vehicle power supply system 100A or the vehicle power supply system 100B so that they may be collectively considered as a vehicle drive system 300.

Having described the present disclosure in detail as above, the foregoing description is illustrative in all aspects and the present disclosure is not limited thereto. It is understood that countless unillustrated variants are conceivable without departing from the scope of the present disclosure.

The invention claimed is:

1. A vehicle power supply system for supplying power to an actuator and a control load mounted on a vehicle, the vehicle power supply system comprising:
   an alternator;
   a first electrical storage device that is charged by the alternator;
   a power generator that generates power in conjunction with traveling of the vehicle;
   a power source unit comprising: a rectifier circuit; a second electrical storage device that is charged by the power generator; and a DC/DC converter provided between the rectifier circuit and the second electrical storage device;
   a charge path used to charge the second electrical storage device with power from the power generator;
   a first power feed path for feeding power to the actuator from the first electrical storage device;
   a second power feed path for feeding power to the actuator from the second electrical storage device;
   a third power feed path for feeding power to the control load from the first electrical storage device;
   a fourth power feed path for feeding power to the control load from the second electrical storage device,
   wherein the power source unit is provided in each of the charge path, the second power feed path and the fourth power feed path, and each of the charge path, the second power feed path and the fourth power feed path are different from each other;
   a first switch provided in the first power feed path; and
   a second switch provided in the second power feed path,
   wherein the opening and closing of the first switch and the second switch is controlled by the control load.

2. A vehicle drive system, comprising:
   the vehicle power supply system according to claim 1, and the actuator.

3. The vehicle power supply system according to claim 1, wherein
   the second electrical storage device is a capacitor, and the DC/DC converter transforms and supplies the voltage output by the second electrical storage device to the second power feed path and the fourth power feed path.

4. The vehicle power supply system according to claim 1, wherein, if the first electrical storage device fails, the first switch becomes non-conductive.

5. The vehicle power supply system according to claim 4, wherein the second switch becomes conductive when a vehicle speed of the vehicle reaches a predetermined threshold value.

6. The vehicle power supply system according to claim 1, wherein
   the power generator is an alternating current generator, and
   the rectifier circuit rectifies and inputs the output of the power generator to the second electrical storage device.

7. The vehicle power supply system according to claim 6, wherein the second electrical storage device is an accumulator.

8. The vehicle power supply system according to claim 7, wherein the DC/DC converter transforms and inputs the voltage output by the rectifier circuit to the second electrical storage device.

9. A vehicle power supply system for supplying power to an actuator and a control load mounted on a vehicle, the vehicle power supply system comprising:
   an alternator;
   a first electrical storage device that is charged by the alternator;
   a power generator that generates power in conjunction with traveling of the vehicle;
   a power source unit comprising: a rectifier circuit; a second electrical storage device that is charged by the power generator; and a DC/DC converter;
   a charge path used to charge the second electrical storage device with power from the power generator;
   a first power feed path for feeding power to the actuator from the first electrical storage device;
   a second power feed path for feeding power to the actuator from the second electrical storage device;
   a third power feed path for feeding power to the control load from the first electrical storage device;
   a fourth power feed path for feeding power to the control load from the second electrical storage device, wherein
   the DC/DC converter is provided between the second power feed path and the fourth power feed path, and the second electrical storage device, and
   the power source unit is provided in each of the charge path, the second power feed path and the fourth power feed path, and each of the charge path, the second power feed path and the fourth power feed path are different from each other;
   a first switch provided in the first power feed path; and
   a second switch provided in the second power feed path,
   wherein the opening and closing of the first switch and the second switch is controlled by the control load.

10. The vehicle power supply system according to claim 9, wherein, if the first electrical storage device fails, the first switch becomes non-conductive.

11. The vehicle power supply system according to claim 10, wherein the second switch becomes conductive when a vehicle speed of the vehicle reaches a predetermined threshold value.

\* \* \* \* \*